(12) United States Patent
Rofougaran et al.

(10) Patent No.: US 9,219,507 B2
(45) Date of Patent: Dec. 22, 2015

(54) BLOCKER-TOLERANT WIDEBAND NOISE-CANCELING RECEIVERS

(75) Inventors: Ahmadreza Rofougaran, Newport Coast, CA (US); Hooman Darabi, Laguna Niguel, CA (US); David Murphy, Costa Mesa, CA (US)

(73) Assignee: Broadcom Corporation, Irvine, CA (US)

( * ) Notice: Subject to any disclaimer, the term of this patent is extended or adjusted under 35 U.S.C. 154(b) by 430 days.

(21) Appl. No.: 13/584,492

(22) Filed: Aug. 13, 2012

(65) Prior Publication Data
US 2014/0045443 A1 Feb. 13, 2014

(51) Int. Cl.
*H03D 7/16* (2006.01)
*H04B 1/10* (2006.01)

(52) U.S. Cl.
CPC ........................................ *H04B 1/10* (2013.01)

(58) Field of Classification Search
CPC ............. H04B 1/12; H04B 1/30; H03G 11/04
USPC .................. 455/305, 296, 303, 504, 307, 313
See application file for complete search history.

(56) References Cited

U.S. PATENT DOCUMENTS

| | | | |
|---|---|---|---|
| 6,426,680 B1 * | 7/2002 | Duncan et al. ................... | 331/34 |
| 8,233,871 B2 * | 7/2012 | Keehr et al. ..................... | 455/285 |
| 8,489,052 B2 * | 7/2013 | Bult et al. ....................... | 455/252.1 |
| 8,750,818 B2 * | 6/2014 | Chung et al. .................... | 455/305 |
| 2004/0219898 A1 * | 11/2004 | Bult et al. ........................ | 455/252.1 |
| 2007/0105504 A1 * | 5/2007 | Vorenkamp et al. ............. | 455/73 |
| 2008/0009257 A1 | 1/2008 | Safarian et al. | |
| 2008/0139162 A1 | 6/2008 | Hafizi | |
| 2010/0267354 A1 | 10/2010 | Mirzaei et al. | |
| 2013/0303103 A1 * | 11/2013 | Mikhemar et al. ............. | 455/303 |
| 2014/0036973 A1 * | 2/2014 | Au et al. ........................ | 375/221 |
| 2014/0171006 A1 * | 6/2014 | Murphy et al. ................ | 455/296 |

FOREIGN PATENT DOCUMENTS

KR 1991-0009206 11/1991

OTHER PUBLICATIONS

D. Murphy et al., Solid-State Circuits Conference Digest of Technical Papers (ISSCC), 2012 IEEE International; Date of Conference: Feb. 19-23, 2012; Murphy, D. Univ of California, Los Angeles, Los Angeles, CA, USA, pp. 74-76, Product Type: Conference Publications.
European Search Report for EP Patent Application No. EP13003627.0, European Patent Office, Munich, Germany, mailed on Dec. 16, 2013.
Ru, Z., et al., "Digitally Enhanced Software-Defined Radio Receiver Robust to Out-of-Band Interference," IEEE Journal of Solid-State Circuits, Dec. 2009, pp. 3359-3375, vol. 44, No. 12.

(Continued)

*Primary Examiner* — Wesley Kim
*Assistant Examiner* — Richard Chan
(74) *Attorney, Agent, or Firm* — Sterne, Kessler, Goldstein & Fox P.L.L.C.

(57) ABSTRACT

Because of associated disadvantages of narrow-band off-chip radio-frequency (RF) filtering, a mixer-first receiver front-end designed to tolerate blockers with minimal gain compression and noise factor degradation is disclosed. The mixer-first receiver front-end includes two separate down-conversion paths that help to minimize added noise and voltage gain prior to baseband filtering, which are critical factors in eliminating narrow-band off-chip RF filtering.

20 Claims, 6 Drawing Sheets

(56) References Cited

OTHER PUBLICATIONS

Office Action directed to related Korean Patent Application No. 10-2013-0092113, mailed Feb. 5, 2015; 10 pages.

English-language abstract of Korean Patent Application Publication No. 1991-0009206; 1 page.

* cited by examiner

BLOCKER-TOLERANT WIDEBAND NOISE-CANCELING RECEIVERS

FIELD OF THE INVENTION

This application relates generally to RF receivers and, more specifically, to RF receiver front-ends.

BACKGROUND

There exist two commonly implemented front-end architectures in radio frequency (RF) receiver design; namely, the homodyne architecture and the heterodyne architecture. The homodyne architecture down-converts a desired channel directly from RF to baseband, whereas the heterodyne architecture down-converts a desired channel to one or more intermediate frequencies (IFs) before down-conversion to baseband. In general, each of these front-end architectures often employ an antenna to receive an RF signal, a band-pass filter to suppress out-of-band interferers in the received RF signal, a low noise amplifier (LNA) to provide gain to the filtered RF signal, and one or more down-conversion stages.

Each component in a receiver front-end, such as those mentioned above, contributes noise to the overall system. The noise of a component can be characterized by its noise factor (F), which is given by the ratio of the signal-to-noise ratio (SNR) at the input of the component to the SNR at the output of the component:

$$F_{COMPONENT} = SNR_{IN}/SNR_{OUT}$$

The noise of the overall receiver front-end increases from input to output as noise from successive components compound. In general, the overall noise factor of the receiver front-end is proportional to the sum of each component's noise factor divided by the cascaded gain of preceding components and is given by:

$$F_{TOTAL} = F_1 + \frac{F_{2-1} - 1}{A_1} + \frac{F_{3-1} - 1}{A_1 A_2} + \ldots + \frac{F_{n-1} - 1}{A_1 A_2 \ldots A_{n-1}}$$

where $F_n$ and $A_n$ represent the noise factor and gain of the $n^{th}$ component in the receiver front-end, respectively. The above equation reveals that the noise factor $F_1$ and gain $A_1$ of the first gain component can have a dominant effect on the overall noise factor of the receiver front-end, since the noise contributed by each successive component is diminished by the cascaded gain of the components that precede it.

To provide adequate sensitivity, therefore, it is often important to keep the noise factor $F_1$ low and the gain $A_1$ high of the first gain component in the receiver front-end. The sensitivity of the receiver front-end determines the minimum signal level that can be detected and is limited by the overall noise factor of the receiver front-end. Thus, in many receiver designs the first gain component in the front-end is an LNA, which can provide high gain, while contributing low noise to the overall RF receiver.

LNAs provide relatively linear gain for small signal inputs. However, for sufficiently large input signals, LNAs can exhibit non-linear behavior in the form of gain compression; that is, for sufficiently large input signals, the gain of the LNA approaches zero. LNA gain compression is a common issue confronted in RF receiver design because large out-of-band interferers referred to as blockers can accompany a comparatively weak desired signal in a received RF signal. If these large out-of-band interferers are not attenuated prior to reaching the LNA, they can seriously affect the linearity of the LNA and degrade the sensitivity of the receiver front-end.

Therefore, a band-pass filter is conventionally employed in the receiver front-end, before the LNA, to attenuate large out-of-band interferers. These filters are typically mechanically-resonant devices, such as surface acoustic wave (SAW) filters, that provide a high quality factor (Q-factor) required by many of today's communication standards. The Q-factor of a tuned circuit, such as a band-pass filter, is the ratio of its resonant frequency (or center frequency) to its 3 dB frequency bandwidth. SAW filters are generally not amenable to monolithic integration on a semiconductor substrate with the RF receiver. However, SAW filters remain conventional in many RF receiver designs because of the limited Q-factor of silicon-based inductors.

Although SAW filters can provide excellent attenuation of large out-of-band interferers and accurate pass-band location, they have several associated disadvantages. First, these filters have an approximate insertion loss of 1-2 dB in their pass-band. This directly adds to the noise factor and degrades sensitivity of the RF receiver. Second, these filters invariably add cost and circuit board area, especially in multi-band applications where several of these filters can be required (e.g., one for each supported band). Finally, the use of narrow-band off-chip SAW filters is not compatible with the concept of software-defined radios (SDRs), which continue to generate considerable interest for their associated advantages in power, speed, and flexibility.

For example, mobile applications such as the cellular standards GSM, UMTS, and LTE, the wireless networking standards Wi-Fi and WiMAX, the mobile TV standard DVB-H, the navigation standard GPS, and the short-range communication standards Bluetooth and RFID, generally use different portions of the radio spectrum that span from 400 MHz all the way to 6 GHz. The trend in mobile devices has been, and continues to be, to combine many (if not all) of these mobile applications into a single mobile device. Rather than adding a separate receiver front-end for every one of these applications, the use of flexible receiver hardware controlled by software can make the mobile device, smaller, more power efficient, and cheaper. This trend of moving functionality into software is the basic idea of SDRs. Saw filters are not compatible with the concept of SDRs because they are narrowband and their pass-bands are generally not programmable.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
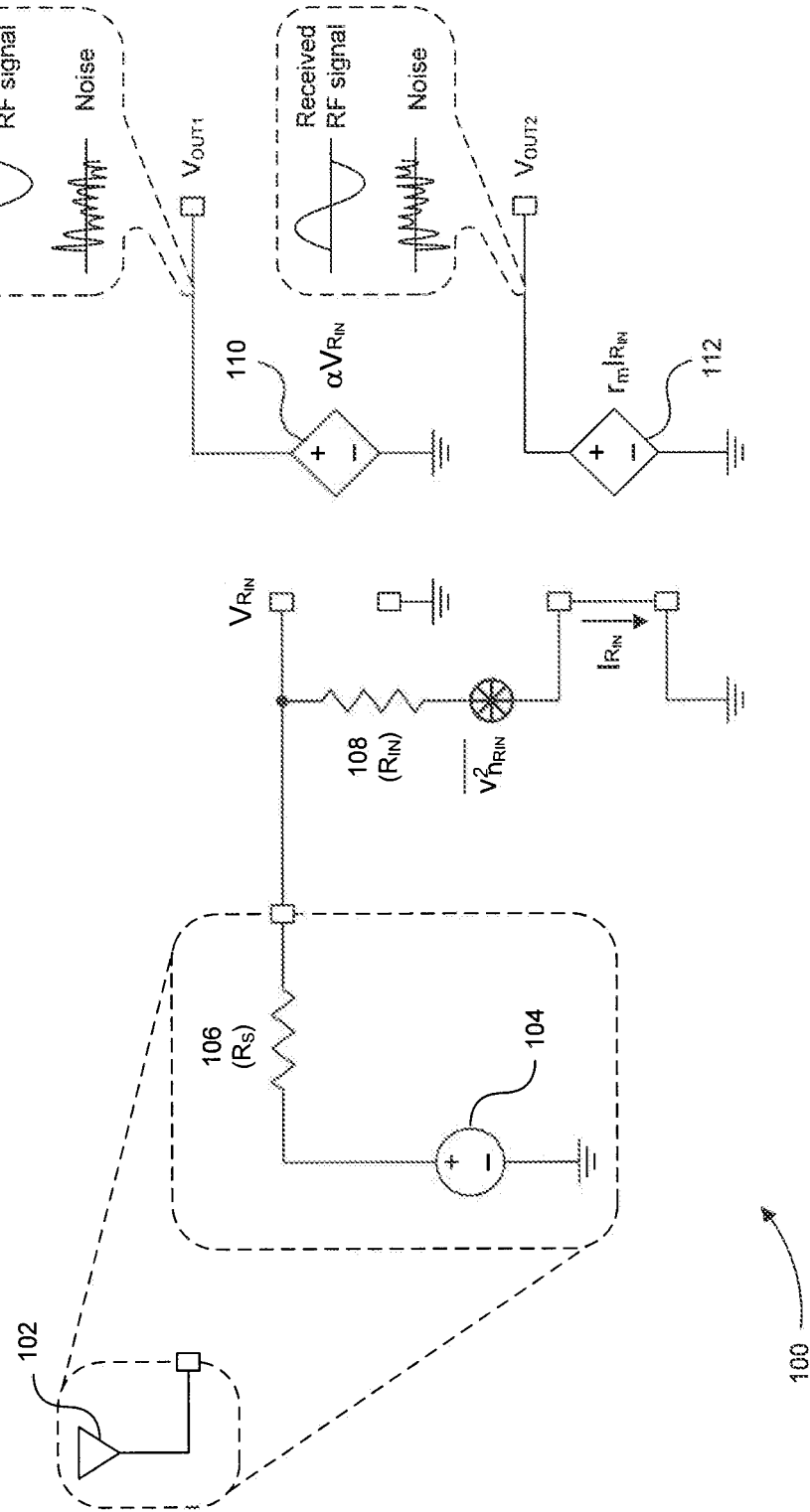
FIG. 1 illustrates a noise canceling technique as applied to a receiver front-end.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Because of the associated disadvantages of narrow-band off-chip RF filtering mentioned above, a mixer-first receiver front-end designed to tolerate blockers with minimal gain compression and noise factor degradation is described herein. The mixer-first receiver front-end includes two separate down-conversion paths that help to minimize added noise and voltage gain prior to baseband filtering, which are critical factors in eliminating narrow-band off-chip RF filtering as explained below.

2. MIXER-FIRST RECEIVER FRONT-END

In a mixer-first receiver front-end, down-conversion of a received RF signal is performed prior to any substantial filtering of the RF signal to remove blockers. Because the RF signal receives no substantial filtering to remove blockers prior to down-conversion, it is important that the front-end contribute minimal voltage gain of the RF signal before, during, and after down-conversion until the down-converted signal can be filtered to remove blockers. Minimizing voltage gain until the down-converted signal can be filtered prevents gain compression of amplifying elements due to blockers. Furthermore, because the RF signal is to receive substantially no voltage gain prior to baseband filtering, it is important that minimal noise be added to the RF signal before and during down-conversion so as not to overwhelm the information carried by the often weak RF signal.

The mixer-first receiver front-end of the present disclosure includes two separate down-conversion paths that help to minimize added noise and voltage gain prior to baseband filtering, thereby allowing narrow-band off-chip RF filtering to be dispensed with. Before discussing specific embodiments of the mixer-first receiver front-end of the present disclosure, a noise canceling technique utilized by the front-end is described.

FIG. 1 specifically illustrates the concept of the noise canceling technique utilized by the mixer-first receiver front-end of the present disclosure. As shown in FIG. 1, a receiver front-end 100 includes an antenna 102, which can be represented by a voltage source 104 in series with a source output resistance ($R_S$) 106, and an input matching resistance ($R_{IN}$) 108. The input matching resistance 108 is typically included to match the source output resistance 106 associated with antenna 102. Providing a matching resistance (commonly referred to as impedance matching) helps to avoid signal reflections and maximize power transfer from the antenna 102 to the other down-stream elements of the receiver front-end 100. However, as with all resistive elements, the input matching resistance 108 generates thermal noise that can overwhelm the often weak RF signal received by the antenna 102. The thermal noise generated by the input matching resistance 108 is shown in FIG. 1 as a series voltage source with a mean square value of $$\overline{v_{n_{R_{IN}}}^2}.$$

Receiver front-end 100 includes two gain paths to cancel the thermal noise generated by the input matching resistance 108. The first gain path includes a voltage controlled voltage source 110 that provides a first output voltage $V_{OUT1}$ equal to the voltage $V_{R_{IN}}$ measured between the source input resistance 106 and the input matching resistance 108 multiplied by some gain $\alpha$. The second gain path includes a current controlled voltage source 112 that provides a second output voltage $V_{OUT2}$ equal to the current $I_{R_{IN}}$ flowing through the input matching resistance 108 multiplied by some gain $r_m$.

It can be shown that the thermal noise generated by the input matching resistance 108 appears in both the voltage $V_{R_{IN}}$ and the current $I_{R_{IN}}$ 180 degrees out of phase with each other, while the RF signal received by antenna 102 appears in both the voltage $V_{R_{IN}}$ and the current $I_{R_{IN}}$ in-phase with each other. Given this, $r_m$ and $\alpha$ can be determined to adjust the magnitude of the two voltage signals $V_{OUT1}$ and $V_{OUT2}$ such that, when $V_{OUT1}$ and $V_{OUT2}$ are added together (or potentially sensed differentially depending on the relative polarities of $\alpha$ and $r_m$), the thermal noise generated by input matching resistance 108 is substantially canceled, while the RF signal received by antenna 102 is reinforced. For example, based on the exemplary configuration of front-end 100 illustrated in FIG. 1, by setting $r_m$ equal to $-\alpha*R_S$, the magnitude of the two voltage signals $V_{OUT1}$ and $V_{OUT2}$ are adjusted such that, when $V_{OUT1}$ and $V_{OUT2}$ are added together (or potentially sensed differentially depending on the relative polarities of $\alpha$ and $r_m$), the thermal noise generated by input matching resistance 108 is substantially canceled, while the RF signal received by antenna 102 is reinforced.

Figure 2:
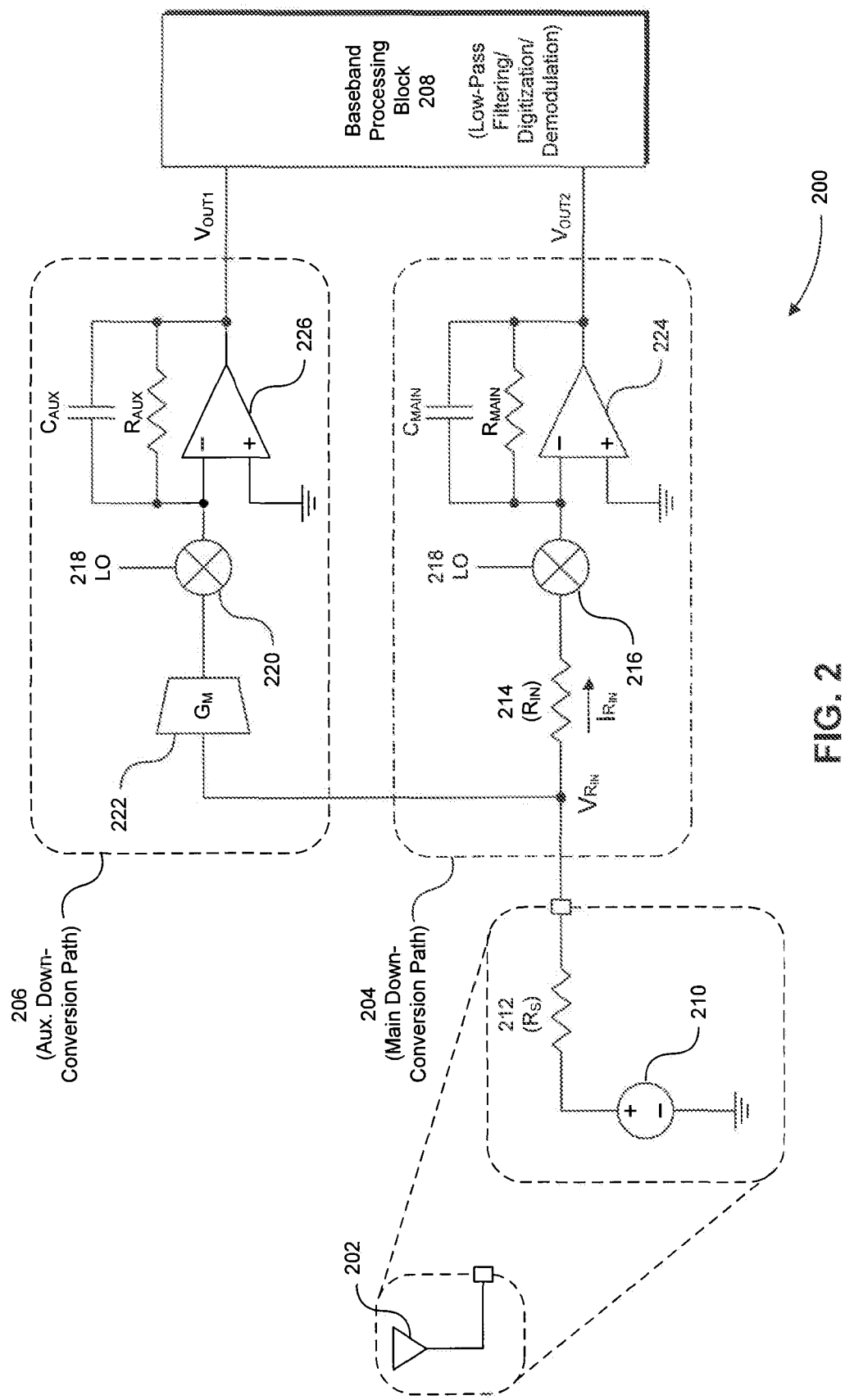
FIG. 2 illustrates a mixer-first receiver front-end with two separate down-conversion paths that exploits the noise canceling technique illustrated in FIG. 1 in accordance with embodiments of the present disclosure.

FIG. 2 illustrates a mixer-first receiver front-end 200 in accordance with embodiments of the present disclosure that utilizes the above described noise canceling technique. The mixer-first receiver front-end 200 can be used in several different devices to receive wireless RF signals, such as cell phones, wireless modems, wireless routers and access points, etc. As shown in FIG. 2, the mixer-first receiver front-end 200 includes an antenna 202, two down-conversion paths 204 and 206, and a baseband processing block 208. The antenna 202 can be represented by a voltage source 210 in series with a source output resistance ($R_S$) 212, which can be, for example, 50 Ohms. The source output resistance 212 is matched by an input matching resistance ($R_{IN}$) 214 to avoid signal reflections and maximize power transfer from the antenna 202 to the other down-stream elements of the mixer-first receiver front-end 200.

In operation, the two down-conversion paths 204 and 206 down-convert an RF signal received by the antenna 202 to baseband or some IF and utilize the above described noise canceling technique in FIG. 1 to substantial cancel thermal noise generated by the input matching resistance 214, while substantially avoiding voltage gain of the RF signal. The main down-conversion path 204 includes a passive mixer 216 to down-convert the current signal $I_{R_{IN}}$ flowing through the input matching resistance 214 by an amount substantially equal to the frequency of a local oscillator signal (LU) 218. The current signal $I_{R_{IN}}$ includes both the RF signal received by the antenna 202 and the thermal noise signal generated by the input matching resistance 214. The auxiliary down-conversion path 206 includes a passive mixer 220 to down-convert the voltage signal $V_{R_{IN}}$ measured between the source output resistance 212 and the input matching resistance 214 by an amount substantially equal to the frequency of the same LU signal 218 used by passive mixer 216. The frequency of the LO signal 218 can be tuned, for example, over a wide frequency range based on a position of a desired channel in the spectrum of the received RF signal. Like the current signal $I_{R_{IN}}$, the voltage signal $V_{R_{IN}}$ includes both the RF signal received by the antenna 202 and the thermal noise signal generated by the input matching resistance 214. An additional transconductance cell ($G_M$) 222 is included in auxiliary down-conversion path 206 to convert the voltage signal $V_{R_{IN}}$ into a corresponding current signal. The transconductance cell 222 can be implemented, for example, as an inverter.

Although the thermal noise signal and the RF signal appear in both the current signal $I_{R_{IN}}$ and the voltage signal $V_{R_{IN}}$, as noted above in FIG. 1, it can be shown that the thermal noise signal in $V_{R_{IN}}$ is 180 degrees out of phase with the thermal noise signal in $I_{R_{IN}}$, while the RF signal in $V_{R_{IN}}$ is in-phase with the RF signal in $I_{R_{IN}}$. Given this, transimpedance operational amplifiers 224 and 226 can be respectively used to convert and scale the down-converted current signals at the output of passive mixers 218 and 220, into two voltage signals $V_{OUT1}$ and $V_{OUT2}$ such that, when $V_{OUT1}$ and $V_{OUT2}$ are added together (or potentially sensed differentially depending on the relative polarities of the gains applied by the transfer functions), the thermal noise generated by input matching resistance 214 is substantially canceled, while the RF signal received by antenna 202 is reinforced.

In general, the transfer functions of the transimpedance operational amplifiers 224 and 226 are determined based on their feedback networks. In at least one embodiment, the transimpedance operational amplifiers 224 and 226 include a resistive element and a capacitive element in parallel in their feedback networks, as shown in FIG. 2. The capacitive elements $C_{MAIN}$ and $C_{AUX}$ can be included for stability purposes and the resistive elements $R_{MAIN}$ and $R_{AUX}$ can be included to set a current-to-voltage conversion gain for the transimpedance operational amplifiers 224 and 226, respectively. Without loss of generality, if capacitive elements $C_{MAIN}$ and $C_{AUX}$ are ignored, it can be shown that the current-to-voltage conversion gains are substantially equal to $-R_{MAIN}$ and $-R_{AUX}$, assuming that transimpedance operational amplifiers 224 and 226 have sufficient open-loop gains.

Based on the exemplary configuration of mixer-first receiver front-end 200 illustrated in FIG. 2, by setting $R_{MAIN}$ equal to $-R_{AUX}*R_S$, the magnitude of the two voltage signals $V_{OUT1}$ and $V_{OUT2}$ can be adjusted such that, when $V_{OUT1}$ and $V_{OUT2}$ are added together (or potentially sensed differentially depending on the relative polarities of $\alpha$ and $r_m$), the thermal noise generated by input matching resistance 214 is substantially canceled, while the RF signal received by antenna 202 is reinforced. However, other settings for $R_{MAIN}$ and $R_{AUX}$ are possible and can be used for other RF receiver front-end configurations.

By employing passive mixers 216 and 220 (which are bidirectional) and transimpedance operational amplifiers 224 and 226, the virtual ground at the negative summing nodes of transimpedance operational amplifiers 224 and 226 appears ideally at the RF side of passive mixers 216 and 220 where the RF signal from the antenna 202 is received, thereby suppressing voltage swing prior to baseband or IF filtering to remove blockers. Thus, because mixer-first receiver front-end 200 suppresses noise, while minimizing voltage gain, the mixer-first receiver front-end 200 can be considered blocker-tolerant. In addition, because passive mixer 216 is bidirectional, the noise of the transimpedance operational amplifier 224 up-converts at the input of the mixer-first receiver front-end 200 and is canceled along with the thermal noise generated by input matching resistance 214. The noise of the transimpedance operational amplifier 226 contributes negligibly when driven by a current source-like transconductance cell 222.

Following down-conversion of the RF signal received by antenna 202 by down-conversion paths 204 and 206 as described above, baseband processing block 208 processes $V_{OUT1}$ and $V_{OUT2}$ using one or more processors and/or circuits. For example, baseband processing block 208 can low-pass filter $V_{OUT1}$ and $V_{OUT2}$, either separately or after having been added (or subtracted) together, to remove blockers and other interference. In addition, baseband processing block 208 can further perform digitization of $V_{OUT1}$ and $V_{OUT2}$, either separately or after having been added (or subtracted) together, using one or more analog-to-digital converters (ADCs). The ADCs can be, for example, delta-sigma ADCs. In addition, baseband processing block 208 can perform low-pass filtering and digitization of $V_{OUT1}$ and $V_{OUT2}$ in any order relative to each other. Further, baseband processing block 208 can demodulate the down-converted RF signal contained within $V_{OUT1}$ and $V_{OUT2}$ to recover information.

3. MIXER-FIRST RECEIVER FRONT-END WITH HARMONIC REJECTION MIXERS

The LO signal 218 used by passive mixers 216 and 220 in FIG. 2 to down-convert a received RF signal typically approximates a square waveform. Unlike a single-tone sinusoidal waveform, a square waveform contains harmonics at specific multiples of the fundamental frequency of the LO signal. Consequently, undesired portions of the RF signal located at these harmonics can be down-converted by the passive mixers 216 and 220 and interfere with a desired portion of the RF signal at baseband.

Figure 3:
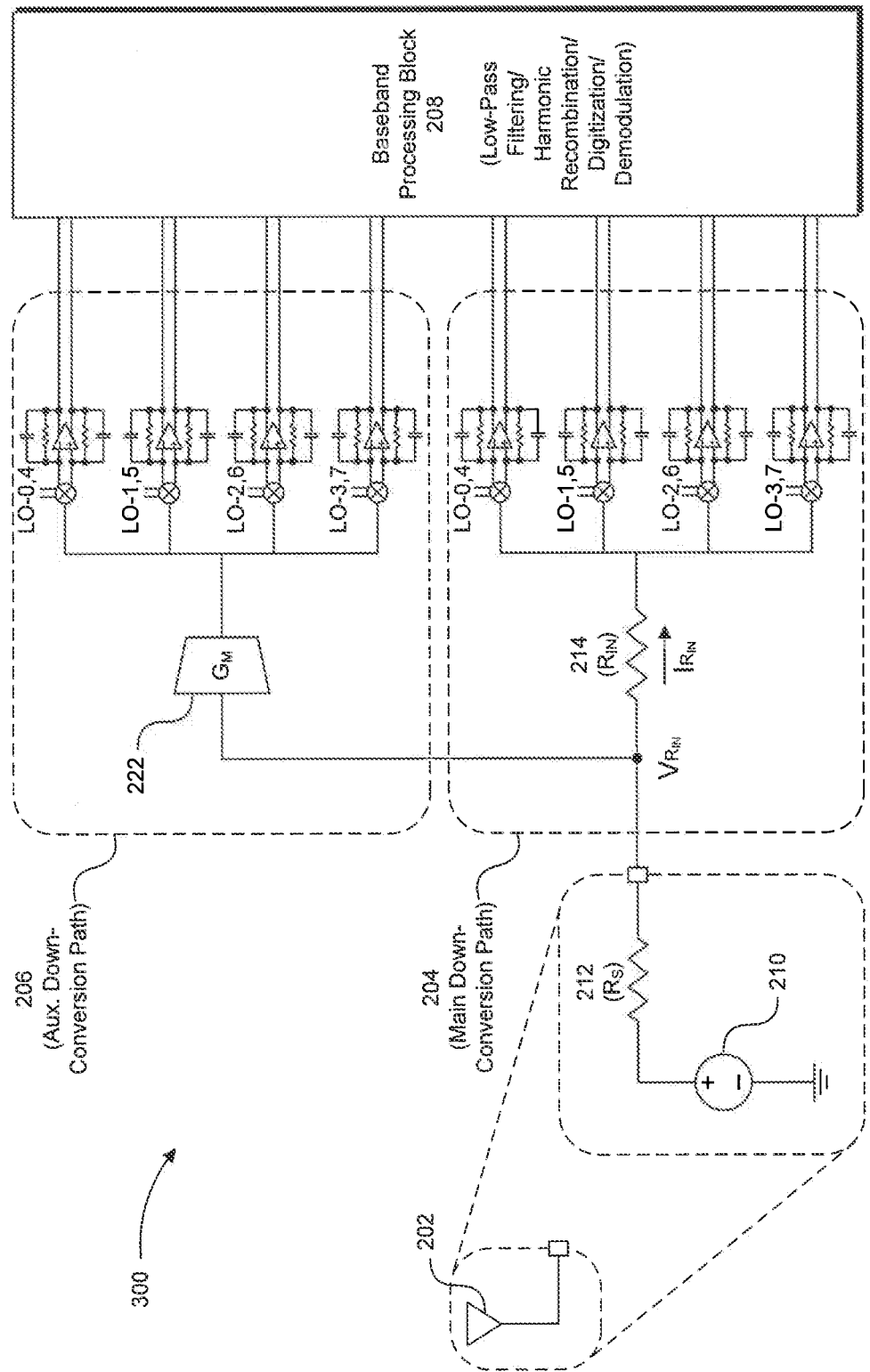
FIG. 3 illustrates a mixer-first receiver front-end designed to limit interference caused by higher-order harmonic effects in accordance with embodiments of the present disclosure.

FIG. 3, described below, provides a mixer-first receiver front-end 300 designed to limit interference caused by these higher-order harmonic effects in accordance with embodiments of the present disclosure. The mixer-first receiver front-end 300 includes the same basic structure as the mixer-first receiver front-end 200 illustrated in FIG. 2. However, the passive mixers 216 and 220 respectively included in down-conversion paths 204 and 206 have each been replaced by an eight-phase passive harmonic rejection mixer constructed from four single-balanced passive mixers. Correspondingly, the transimpedance operational amplifiers 224 and 225 have each been replaced with four transimpedance operational amplifiers that are each coupled to a respective one of the single-balanced passive mixers. It should be noted that, in other embodiments, lower or higher order passive harmonic rejection mixers can be used.

Figure 4:
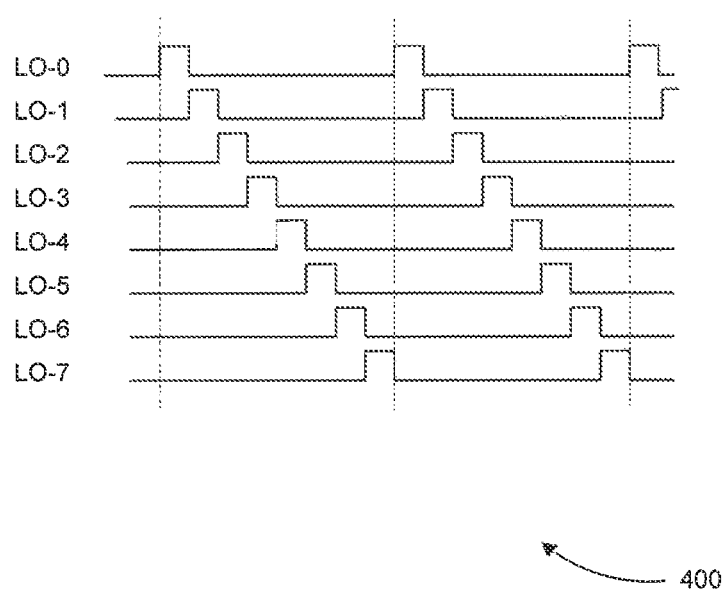
FIG. 4 illustrates a waveform diagram of exemplary LO signals for use in an eight-phase harmonic rejection mixer in accordance with embodiments of the present disclosure.

As shown in FIG. 3, the four single-balanced passive mixers included in each down-conversion path 204 and 206 receive a respective set of LO signals. The first respective passive mixer in down-conversion paths 204 and 206 receives LO signals 0 and 4, the second respective passive mixer in down-conversion paths 204 and 206 receives LO signals 1 and 5, the third respective passive mixer in down-conversion paths 204 and 206 receives LO signals 2 and 6, and the fourth respective passive mixer in down-conversion paths 204 and 206 receives LO signals 3 and 7. Exemplary waveforms 400 for the LO signals 0-7 are shown in FIG. 4. As shown in FIG. 4, the exemplary LO signals are non-overlapping and have a duty-cycle substantially equal to 12.5%. It can be shown that, by using appropriately weighted combinations of the outputs of the four transimpedance operational amplifiers in each down-conversion path 204 and 206, the amount of noise that folds down to baseband as a result of the higher-order harmonic effects discussed above can be reduced and/or nulled. The weighting and recombination can be performed by baseband processing block 208.

It should be noted that, in other embodiments, the mixer-first receiver front-end 300 can be further constructed as a fully differential receiver front-end. In other words, in other embodiments, the mixer-first receiver front-end 300 can be further constructed to process a differential RF signal received by antenna 202 by replacing transconductance cell 222 with a differential transconductance cell and by replacing the four single-balanced passive mixers in each down-conversion path 204 and 206 with double-balanced passive mixers.

4. PASSIVE MIXERS

Figure 5:
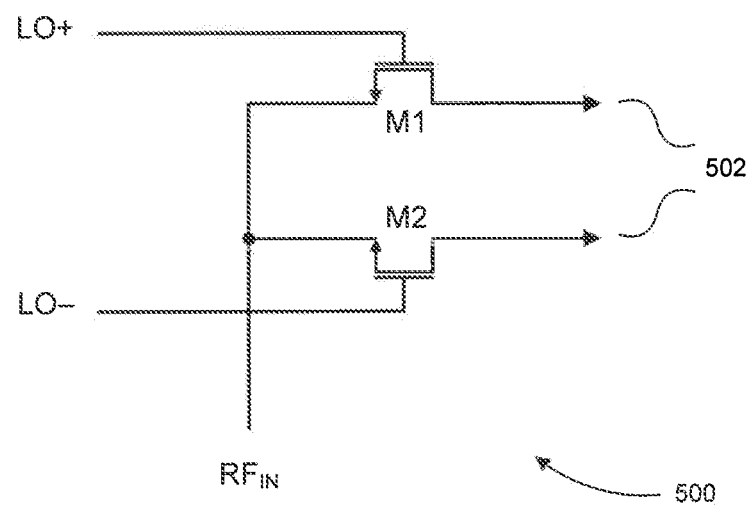
FIG. 5 illustrates a single-balanced passive mixer in accordance with embodiments of the present disclosure.

FIG. 5 illustrates an exemplary implementation of a single-balanced passive mixer 500 that can be used to implement the single-balanced passive mixers shown in FIG. 3. The single-balanced passive mixer 500 includes switching devices M1 and M2. In an embodiment, switching devices M1 and M2 are metal-oxide semiconductor field effect transistors (MOSFETs). Specifically, switching devices M1 and M2 are n-channel MOSFETs (NMOS). However, as will be appreciated by one of ordinary skill in the art, switching devices M1 and M2 can be implemented using other suitable switching devices. In the embodiment of FIG. 5, switches M1 and M2 are operated substantially in their linear region when ON.

In operation, the single-balanced passive mixer 500 receives a differential LO signal that has a frequency of $\omega_{LO}$. The gate of switching device M1 is coupled to the positive end of the LO signal (LO+), and the gate of switching device M2 is coupled to the negative end of the LO signal (LO−). Because the LO signal is differential and its two ends are substantially 180-degrees out of phase, switching devices M1 and M2 are switched ON and OFF at different times at the frequency of the LO signal ($\omega_{LO}$). The switching of transistors M1 and M2 at different times at a frequency of $\omega_{LO}$ effectively multiplies the RF input signal ($RF_{IN}$), coupled to the sources of switching devices M1 and M2, by ±1. This effective multiplication results in frequency conversion of the RF input signal by the sum ($\omega_{RF}+\omega_{LO}$) and difference ($\omega_{RF}-\omega_{LO}$ or $\omega_{LO}-\omega_{RF}$) in frequency between the LO signal and the RF input signal. The frequency-converted RF input signal is provided differentially at an output 502.

The use of the single-balanced passive mixer 500 effectively removes any DC offset component of the LO signal. Removal of the DC component helps to reduce undesired feed-through of the RF input signal at the output 502 of the single-balanced passive mixer 500.

Figure 6:
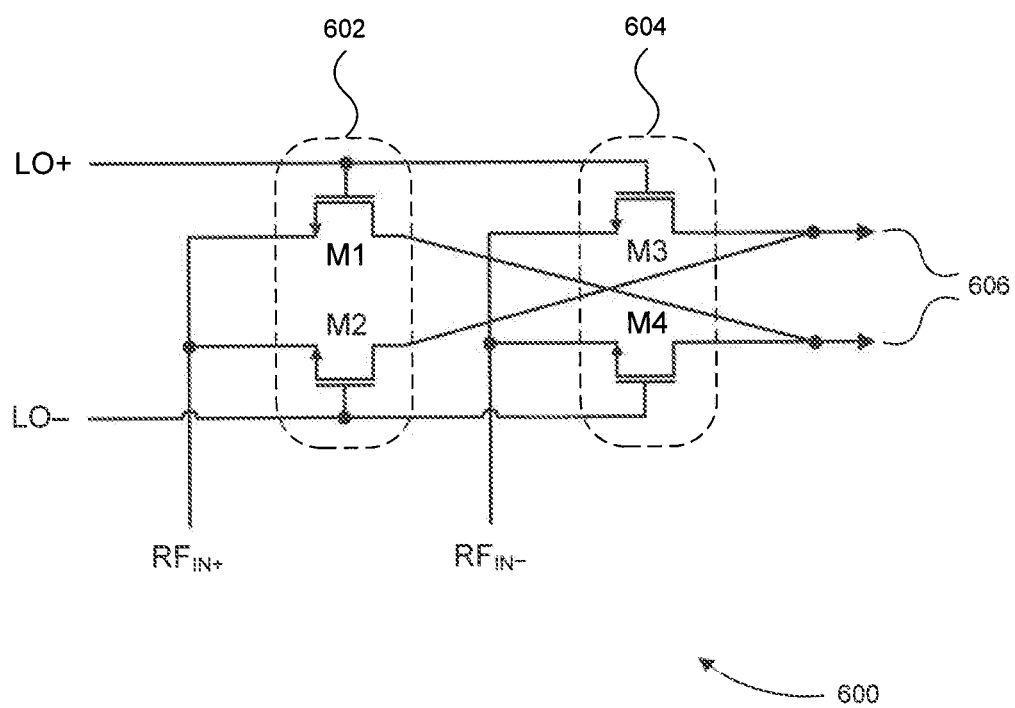
FIG. 6 illustrates a double-balanced passive mixer in accordance with embodiments of the present disclosure.

FIG. 6 illustrates an exemplary implementation of a double-balanced passive mixer 600 that can be used to implement the passive mixers in the receiver front-end 300 of FIG. 3 when a fully differential receiver front-end is desired.

The double-balanced passive mixer 600 includes switching devices M1, M2, M3, and M4. In an embodiment, switching devices M1-M4 are metal-oxide semiconductor field effect transistors (MOSFETs). Specifically, switching devices M1-M4 are n-channel MOSFETs (NMOS). However, as will be appreciated by one of ordinary skill in the art, switching devices M1-M4 can be implemented using other suitable switching devices. In the embodiment of FIG. 6, switches M1-M4 are operated substantially in their linear region when ON.

In operation, double-balanced passive mixer 600 receives a differential LO signal that has a frequency of $\omega_{LO}$. Double-balanced mixer 600 is essentially formed from two single-balanced passive mixers 602 and 604. The gates of switching devices M1 and M3 are coupled to the positive end of the LO signal (LO+), and the gates of switching devices M3 and M4 are coupled to the negative end of the LO signal (LO−). Because the LO signal is differential and its two ends are substantially 180-degrees out of phase, switching device pair M1 and M2 and switching device pair M3 and M4 are switched ON and OFF at different times at the frequency of the LO signal ($\omega_{LO}$). The switching at a frequency of $\omega_{LO}$ effectively multiplies the positive RF input signal ($RF_{IN+}$), coupled to the sources of switching devices M1 and M2, and the negative RF input signal ($RF_{IN-}$), coupled to the sources of switching devices M3 and M4, by ±1. This effective multiplication results in frequency conversion of the differential RF input signal by the sum ($\omega_{RF}+\omega_{LO}$) and difference ($\omega_{RF}-\omega_{LO}$ or $\omega_{LO}-\omega_{RF}$) in frequency between the in-phase LO signal and the differential RF input signal. The frequency-converted RF input signal is provided differentially at an output 606.

The use of the double-balanced passive mixer 600 effectively removes any DC offset component of the LO signal, as well as any DC offset component of the differential RF input signal. Removal of the DC components helps to reduce undesired feed-through of the RF input signal and the LO signal at the output 606 of the double-balanced passive mixer 600.

5. LOW-PASS FILTER

Figure 7:
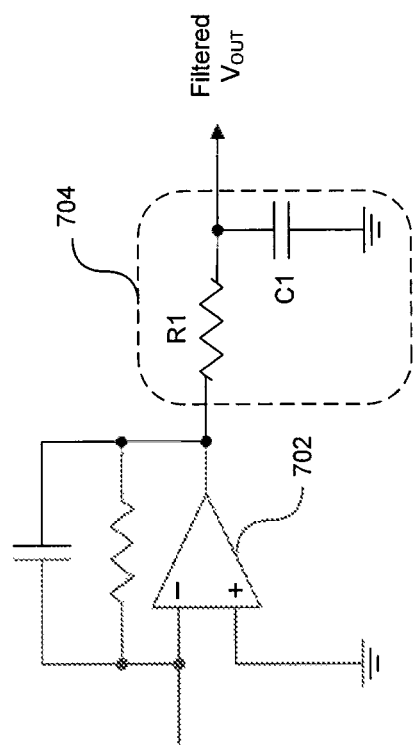
FIG. 7 illustrates exemplary single-ended low-pass filter in accordance with embodiments of the present disclosure.

FIG. 7 illustrates an exemplary implementation of a low-pass filter that can be used in a mixer-first receiver front-end as disclosed above. Specifically, FIG. 7 illustrates a single-ended transimpedance operational amplifier 702 that can be, for example, one of the single-ended transimpedance operational amplifiers 224 and 226 shown in FIG. 2, and a low-pass filter 704. The low-pass filter 704 can be used to attenuate interferers or blockers in the down-converted signal provided as output from one of the transimpedance operational amplifiers 224 and 226.

The low-pass filter 704 specifically includes a resistor R1 and a capacitor C1, and the filtered output of the low-pass filter 704 is taken between the series coupling of R1 and C1. In one embodiment, the resistor R1 and/or the capacitor C1 are made programmable, such that characteristics of the pass-band of the low-pass filter can be adjusted.

It should be noted that, when low-pass filter 704 is used in a mixer-first receiver front-end similar to the one shown in FIG. 3 that implements harmonic rejection mixers, a respective low-pass filter 704 can be placed at the output of each transimpedance operational amplifier or the low-pass filter 704 can used to filter the signals after harmonic recombination is performed. In the latter instance, one or two (where there is in-phase and quadrature components) low-pass filters 704 can be used. It should be further noted that, in other embodiments, low-pass filter 704 can be replaced by a switched capacitor filter implementing a low-pass function. The switching, frequency of such a filter can be made programmable to adjust the pass-band of the filter.

Figure 8:
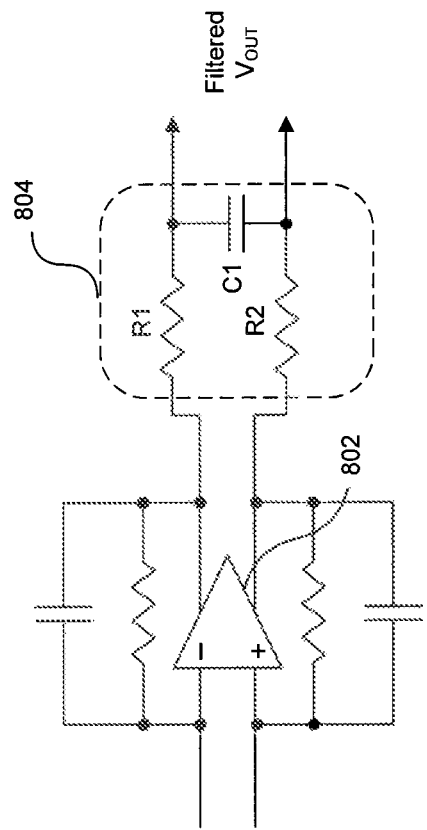
FIG. 8 illustrates an exemplary differential low-pass filter in accordance with embodiments of the present disclosure.

FIG. 8 illustrates another exemplary implementation of a low-pass filter that can be used in a mixer-first receiver front-end as disclosed above. Specifically, FIG. 8 illustrates a differential transimpedance operational amplifier 802 that can be, for example, one of the differential transimpedance operational amplifiers shown in FIG. 3, and a differential low-pass filter 804. The differential low-pass filter 804 can be used to attenuate interferers or blockers in the down-converted signal provided as output from one of the transimpedance operational amplifiers shown in FIG. 3.

The differential low-pass filter 804 specifically includes resistors R1 and R2 and a capacitor C1, and the filtered output of the differential low-pass filter 804 is taken as shown in FIG. 8. In one embodiment, the resistors R1 and R2 and/or the capacitor C1 are made programmable, such that characteristics of the pass-band of the low-pass filter can be adjusted.

It should be noted that, when low-pass filter 804 is used in a mixer-first receiver front-end similar to the one shown in FIG. 3 that implements harmonic rejection mixers, a respective differential low-pass filter 804 can be placed at the output of each transimpedance operational amplifier or the differential low-pass filter 804 can used to filter the signals after harmonic recombination is performed. In the latter instance, one or two (where there is in-phase and quadrature components) differential low-pass filters 804 can be used. It should be further noted that, in other embodiments, low-pass filter 804 can be replaced by a switched capacitor filter implementing a low-pass function. The switching frequency of such a filter can be made programmable to adjust the pass-band of the filter.

6. CONCLUSION

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A receiver front-end for receiving a radio-frequency (RF) signal represented by an RF voltage signal and an RF current signal from an antenna, the receiver front-end comprising:
a main down-conversion path comprising: a first passive mixer configured to mix the RF current signal with a local-oscillator (LO) signal to provide a first down-converted signal, and a first transimpedance amplifier configured to apply a first gain to the first down-converted signal to provide a first output signal; and
an auxiliary down-conversion path comprising: a transconductance cell configured to convert the RF voltage signal into a corresponding current signal, a second passive mixer configured to mix the corresponding current signal with the LO signal to provide a second down-converted signal, and a second transimpedance amplifier configured to apply a second gain to the second down-converted signal to provide a second output signal,
wherein the RF voltage signal is a voltage between a source impedance of the antenna and an impedance matching resistor, and the RF current signal is a current flowing through the impedance matching resistor.

2. The receiver front-end of claim 1, wherein the first gain is determined based on the second gain and the source impedance of the antenna.

3. The receiver front-end of claim 1, wherein the first gain is proportional to the product of the second gain and the source impedance of the antenna.

4. The receiver front-end of claim 1, wherein the transconductance cell is an inverter.

5. The receiver front-end of claim 1, further comprising:
a baseband processing block configured to process the first output signal and the second output signal as two ends of a differential signal.

6. The receiver front-end of claim 1, further comprising:
a baseband processing block configured to sense the first output signal and the second output signal differentially such that noise from the impedance matching resistor is canceled and the RF signal is reinforced.

7. The receiver front-end of claim 6, wherein the baseband processing block is further configured to low-pass filter and digitize the first output signal and the second output signal.

8. The receiver front-end of claim 1, wherein the first passive mixer is included within a first harmonic rejection mixer and the second passive mixer is included within a second harmonic rejection mixer.

9. The receiver front-end of claim 1, further comprising a low-pass filter configured to filter the first output signal.

10. The receiver front-end of claim 9, wherein the low-pass filter is a switched capacitor filter.

11. A receiver front-end for receiving a radio-frequency (RF) signal represented by an RF voltage signal and an RF current signal from an antenna, the RF front-end comprising:
a first passive mixer configured to down-convert the RF current signal to provide a first down-converted signal;
a first transimpedance amplifier configured to receive the first down-converted signal from the first passive mixer at a first summing node at virtual ground and apply a first gain to the first down-converted signal to provide a first output signal;
a second passive mixer configured to down-convert a current signal corresponding to the RF voltage signal to provide a second down-converted signal; and
a second transimpedance amplifier configured to receive the second down-converted signal from the second passive mixer at a second summing node at virtual ground and apply a second gain to the second down-converted signal to provide a second output signal, wherein the RF voltage signal is a voltage between a source impedance of the antenna and an impedance matching resistor and the RF current signal is a current flowing through the impedance matching resistor.

12. The receiver front-end of claim 11, wherein the first gain is determined based on the second gain and the source impedance of the antenna.

13. The receiver front-end of claim 11, wherein the first gain is proportional to the product of the second gain and the source impedance of the antenna.

14. The receiver front-end of claim 11, further comprising:
a baseband processing block configured to process the first output signal and the second output signal as two ends of a differential signal.

15. The receiver front-end of claim 11, further comprising:
a baseband processing block configured to sense the first output signal and the second output signal differentially such that noise from the impedance matching resistor is canceled and the RF signal is reinforced.

16. The receiver front-end of claim 15, wherein the baseband processing block is further configured to low-pass filter and digitize the first output signal and the second output signal.

17. The receiver front-end of claim 11, wherein the first passive mixer is included within a first harmonic rejection mixer and the second passive mixer is included within a second harmonic rejection mixer.

18. The receiver front-end of claim 11, further comprising a low-pass filter configured to filter the first output signal.

19. The receiver front-end of claim 18, wherein the low-pass filter is a switched capacitor filter.

20. A receiver front-end for receiving a radio-frequency (RF) signal represented by an RF voltage signal and an RF current signal from an antenna, the RF front-end comprising:
a main down-conversion path configured to down-convert the RF current signal to provide a first down-converted signal and apply a first gain to the first down-converted signal; and
an auxiliary down-conversion path configured to down-convert a current signal corresponding to the RF voltage signal to provide a second down-converted signal and apply a second gain to the second down-converted signal,
wherein the first gain is substantially proportional to the result of multiplying the second gain and a source impedance associated with the antenna.

* * * * *